(12) United States Patent
Robson

(10) Patent No.: US 7,479,611 B1
(45) Date of Patent: Jan. 20, 2009

(54) TURN SIGNAL BUTTON EXTENDER

(76) Inventor: Christopher A Robson, 4485 Kell Rd., Fairview, PA (US) 16415

( * ) Notice: Subject to any disclaimer, the term of this patent is extended or adjusted under 35 U.S.C. 154(b) by 190 days.

(21) Appl. No.: 11/606,465

(22) Filed: Nov. 29, 2006

(51) Int. Cl.
*H01H 9/00* (2006.01)

(52) U.S. Cl. ............ 200/331; 200/330; 200/61.85

(58) Field of Classification Search ........... 200/330, 200/331, 61.27, 61.54, 61.28, 61.57, 61.85, 200/61.87, 61.88, 329, 5 R, 5 A, 333, 341
See application file for complete search history.

(56) References Cited

U.S. PATENT DOCUMENTS

| | | | | |
|---|---|---|---|---|
| 3,927,282 A | * | 12/1975 | Firstenberg | ............ 200/330 |
| 4,427,864 A | * | 1/1984 | Oster | ............ 200/330 |
| 4,455,463 A | * | 6/1984 | Rohl | ............ 200/61.85 |
| 4,508,944 A | * | 4/1985 | Yashima et al. | ............ 200/61.85 |
| 5,124,513 A | * | 6/1992 | Blair | ............ 200/331 |
| 5,317,986 A | * | 6/1994 | Blanes | ............ 200/333 |
| 5,433,702 A | * | 7/1995 | Zelman et al. | ............ 200/61.85 |
| 5,960,943 A | * | 10/1999 | Delfino | ............ 200/330 |
| 6,437,264 B1 | * | 8/2002 | Mizuta et al. | ............ 200/61.54 |

* cited by examiner

*Primary Examiner*—Michael A Friedhofer
(74) *Attorney, Agent, or Firm*—Richard K Thomson

(57) ABSTRACT

A generally rectangular extender is designed to be secured to the upper face of a turn signal button using a foamed two-sided adhesive to enable, particularly, riders with smaller hands to be able to more safely utilize the turn signal buttons of, for example, models of 1996-2006 Harley Davidson motorcycles.

6 Claims, 2 Drawing Sheets

TURN SIGNAL BUTTON EXTENDER

BACKGROUND AND SUMMARY OF THE INVENTION

The present invention is directed to motorcycle accessories. More particularly, the present invention is directed to a turn signal extension. While this extender has been designed with specific application to, and specifically fits, Harley Davidson motorcycles, model years 1996 to present, it will be understood that the concept could be adapted for other cycles, as well.

With the growing popularity of bike riding, more and more ladies who were once relegated to the "hop-aboard-and-hang-on" role, are taking to the highway on their own cycles. Many of these adventurous women have smaller hands making it difficult and, in some cases, impossible for their thumbs to reach the turn signal button on the handle bars. Therefore, in order to engage the turn signal, the rider must take her opposite hand off of the handle bars and, glancing down, reach cross-handed to engage the opposite turn signal. Needless to say, this maneuver increases the risk associated with biking and turns an action intended to enhance safety into a safety concern.

It is an object of the present invention to alleviate this risk. The present turn signal button extender makes engaging the turn signal easier for riders with smaller hands, but facilitates engagement by all cyclists with the thumb of the hand corresponding to the direction the rider wishes to turn, as the signal button was designed and intended for operation.

The present invention comprises an extender for electric turn signal buttons on motorcycles having a first generally rectangular surface portion designed to overlie a face of the turn signal button having a length $l_1$ and a width $w_1$, the generally rectangular surface portion having a length $l_2$ and a width $w_2$ being greater than length $l_1$ and a width $w_1$ of the face of the turn signal button; adhesive means to secure the generally rectangular surface portion in a position overlying the turn signal button. The extender additionally includes a) a first tab extending orthogonally in a first direction from a first side of said generally rectangular portion at a position adjacent a first end thereof; and, b) a second tab extending orthogonally in a second direction from a second opposite side of the generally rectangular portion at a position adjacent the first end thereof. Most preferably, the second tab occupies a position on the second opposite side immediately opposite a position of the first tab and the first orthogonal direction is the same as the second orthogonal direction. The extender also includes an arcuate finger extending from the first end thereof, the arcuate finger curling from a first direction parallel to the first generally rectangular portion to a direction parallel to the first orthogonal direction. The length $l_2$ of the generally rectangular portion is at least 1.5 times $l_1$ of the turn signal button and the width $w_2$ of the generally rectangular portion is 1.4 times the width $w_1$ of the turn signal button. Preferably, the adhesive means comprises double sided tape adhered to a lower side of the rectangular surface portion with a release strip masking an exposed side thereof. The turn signal extension of the present invention is available from the Robson Company, Girard, Pa., being sold under their trademark THUMBNAIL.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 2:
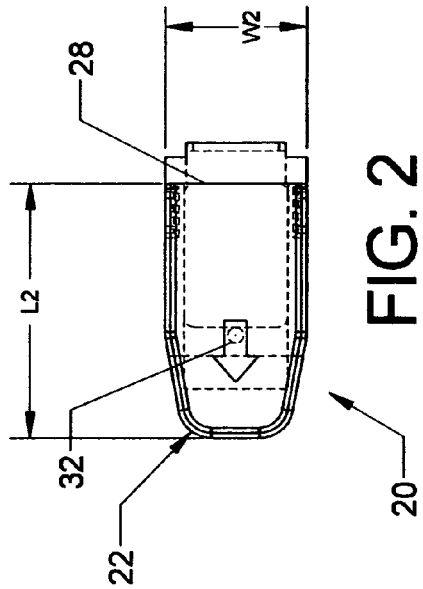
FIG. 2 is a top view of the first embodiment.
Figure 4:
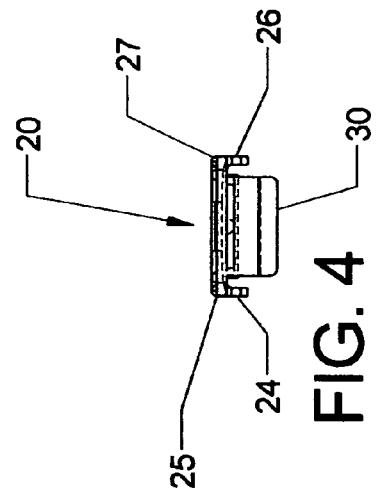
FIG. 4 is an end view of the first embodiment.
Figure 1:
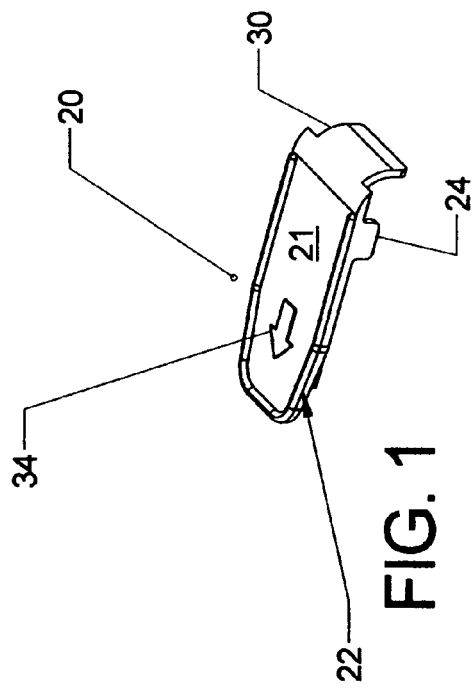
FIG. 1 is a perspective front view of a first embodiment of the turn signal button extender of the present invention.
Figure 3:
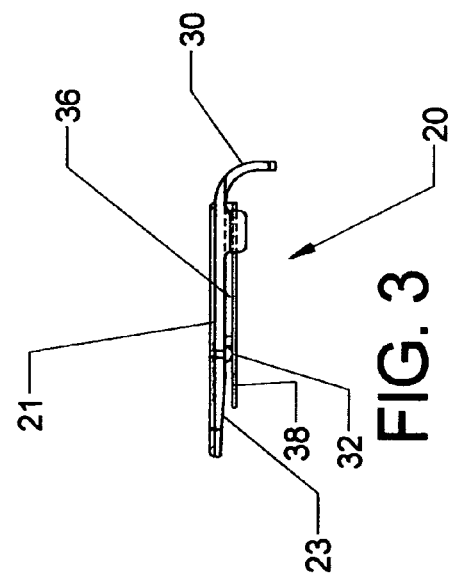
FIG. 3 is a side view of the first embodiment.

A first embodiment of the turn signal button extender of the present invention is shown in FIGS. 1-5 generally at 20. Turn signal button extender 20 has a first generally rectangular surface portion 22 having a length $l_2$ and a width $w_2$ (FIG. 2) which, when compared to the length $l_1$ and width $w_1$ of the electric turn signal button (not shown) which it covers, is at least 1.5 and 1.4 times, these respective dimensions. Turn signal button extender 20 has an upper surface 21 and a lower surface 23.

A first tab 24 extends orthogonally relative to the generally rectangular surface 22 in a first direction from a first side 25 adjacent a first end 28 and a second tab 26 extends orthogonally in a second direction from a second side 27 adjacent that same end 28. Most preferably, first and second tabs 24, 26 are immediately opposite one another on sides 23 and 25, respectively, and first and second directions are the same such that tabs 24, 26 fit on either side of the turn signal button on the bike. An arcuate finger 30 extends from first end 28, curling from a first direction parallel to first generally rectangular portion 22 to a direction parallel to said first orthogonal direction and, hence, in the same direction as first and second tabs 24, 26.

Arcuate finger 30 wraps around the end of the turn signal button more precisely locating it and resisting outward axial forces. Round protrusion 32 extends from the lower surface 23 and is designed to engage the face of the turn signal button near its end to ensure its activation when the upper surface 21 of turn signal extender 20 is contacted by the bike rider's thumb. A graphic arrow 34 depicts the direction of the turn signal being activated and functionally, replaces the arrow on the actual turn signal button which is masked by the extender 20. A double-sided foamed adhesive strip 36 is adhered to the lower side 23 and protected by a release strip 38 until turn signal button extender 20 is installed. Protrusion 32 ensures that the pressure exerted on upper surface 21 is not simply absorbed by the foamed adhesive strip 36 but, rather, actuates the turn signal button as intended.

Figure 5:
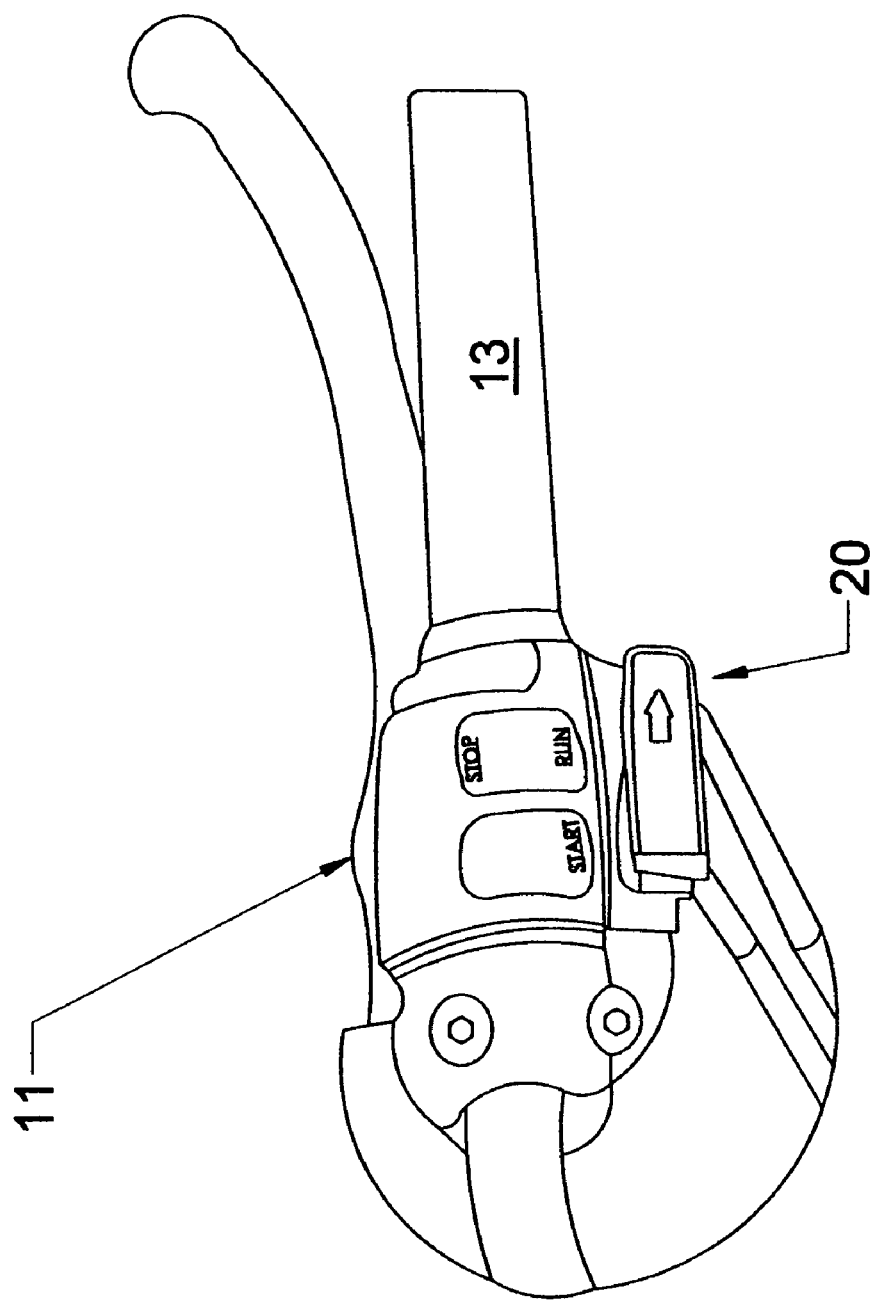
FIG. 5 is a schematic perspective view of the first embodiment depicting the first embodiment in position on the handle bars of a motorcycle.

FIG. 5 shows turn signal button extender as mounted on a typical handle bar 11. Distal end 29 of extender 20 is much closer to the handle 13 and facilitates engagement by the rider's thumb, regardless of her/his hand size. This obviates the need to perform the dangerous maneuver of reaching across with the opposite hand to engage the turn signal button enhancing the safety for not only the bike rider, but for other motorists and pedestrians, as well.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. An extender for electric turn signal buttons on motorcycles comprising:
    a first generally rectangular surface portion designed to overlie a face of the turn signal button having a length $l_1$ and a width $w_1$, said generally rectangular surface portion having a length $l_2$ 1.5 times length $l_1$ and a width $w_2$ greater than $w_1$ of the face of the turn signal button;
    adhesive means to secure said generally rectangular surface portion in a position overlying the turn signal button;
    whereby said extender reduces a distance an operator must reach to engage said turn signal button by nearly ½ $w_1$.

2. The extender of claim 1 further comprising
    a) a first tab extending orthogonally in a first direction from a first side of said generally rectangular portion at a position adjacent a first end thereof; and,
    b) a second tab extending orthogonally in a second direction from a second opposite side of said generally rectangular portion at a position adjacent said first end thereof.

3. The extender of claim 2 wherein said second tab occupies a position on said second opposite side immediately opposite a position of said first tab and said first orthogonal direction is the same as said second orthogonal direction.

4. The extender of claim 1 further comprising an arcuate finger extending from said first end thereof, said arcuate finger curling from a first direction parallel to said first generally rectangular portion to a direction parallel to said first orthogonal direction.

5. The extender of claim 1 wherein said width $w_2$ of said generally rectangular portion is 1.4 times the width $w_1$ of the turn signal button.

6. The extender of claim 1 wherein said adhesive means comprises double sided tape adhered to a lower side of said rectangular surface portion with a release strip masking an exposed side thereof.

* * * * *